US009241564B2

(12) United States Patent
Wehner et al.

(10) Patent No.: US 9,241,564 B2
(45) Date of Patent: Jan. 26, 2016

(54) COLLAPSIBLE SHELVING UNITS AND COLLAPSIBLE ENCLOSURES

(71) Applicant: Worldwide Creations, LLC, Clio, MI (US)

(72) Inventors: Scott D. Wehner, Mt. Morris, MI (US); Zhou Xiao Jin, Linhai (CN)

(73) Assignee: WORLDWIDE CREATIONS, LLC, Clio, MI (US)

( * ) Notice: Subject to any disclaimer, the term of this patent is extended or adjusted under 35 U.S.C. 154(b) by 0 days.

(21) Appl. No.: 14/724,014

(22) Filed: May 28, 2015

(65) Prior Publication Data
US 2015/0257529 A1    Sep. 17, 2015

Related U.S. Application Data

(62) Division of application No. 13/630,213, filed on Sep. 28, 2012, now Pat. No. 9,089,211.

(60) Provisional application No. 61/619,967, filed on Apr. 4, 2012.

(30) Foreign Application Priority Data

Sep. 28, 2011 (CN) ...................... 2011 2 0371803 U

(51) Int. Cl.
| | |
|---|---|
| A47B 43/00 | (2006.01) |
| A47B 43/04 | (2006.01) |
| A47B 53/02 | (2006.01) |
| A47B 55/02 | (2006.01) |
| A47B 57/00 | (2006.01) |

(Continued)

(52) U.S. Cl.
CPC ................. *A47B 43/04* (2013.01); *A47B 53/02* (2013.01); *A47B 55/02* (2013.01); *A47B 57/00* (2013.01); *A47G 25/54* (2013.01); *D06F 57/10* (2013.01)

(58) Field of Classification Search
CPC ........ A47B 43/04; A47B 53/02; A47B 57/00; A47B 55/02; A47G 25/54; D06F 57/10
USPC ............. 211/85.3, 200–202, 167, 85.24, 195, 211/204, 119.01; 108/99–100, 115–116, 108/118, 128, 30; 312/3–6; 52/109, 646, 52/63; 135/96, 143–145, 149, 151, 131, 135/157, 115, 901, 902, 907
See application file for complete search history.

(56) References Cited

U.S. PATENT DOCUMENTS

| | | |
|---|---|---|
| 63,735 A | 4/1867 | Loomis |
| RE3,710 E | 11/1869 | Stone |
| 151,037 A | 5/1874 | Magee |

(Continued)

*Primary Examiner* — Joshua J Michener
*Assistant Examiner* — Devin Barnett
(74) *Attorney, Agent, or Firm* — Young Basile Hanlon & MacFarlane P.C.

(57) ABSTRACT

An enclosure includes a first collapsible shelving unit, a second collapsible shelving unit that is spaced apart from the first collapsible shelving unit, at least a first cover support having a first end connected to the first collapsible shelving unit and a second end connected to the second collapsible shelving unit, and a flexible cover that at least partially encloses the first collapsible shelving unit and the second collapsible shelving unit. The flexible cover is supported with respect to the first collapsible shelving unit and the second collapsible shelving unit at least in part by engagement of the flexible cover with the first cover support. At least a portion of the flexible cover is at least translucent.

10 Claims, 8 Drawing Sheets

(51) Int. Cl.
*A47G 25/54* (2006.01)
*D06F 57/10* (2006.01)

(56) References Cited

U.S. PATENT DOCUMENTS

| | | |
|---|---|---|
| 156,842 A | 11/1874 | Duggan |
| 218,680 A | 8/1879 | McCabe |
| 418,827 A | 1/1890 | St. Marie |
| 539,672 A | 5/1895 | Decker |
| 610,602 A | 9/1898 | Doldt |
| 694,172 A | 2/1902 | Moore |
| 715,038 A | 12/1902 | Dunham |
| 775,158 A | 11/1904 | Wenig |
| 792,827 A | 6/1905 | Holbrook |
| 818,304 A | 4/1906 | Shaw |
| 867,558 A | 10/1907 | Carroll |
| 931,702 A | 8/1909 | Otter |
| 972,590 A | 10/1910 | Yates |
| 1,018,338 A | 2/1912 | Pines |
| 1,025,972 A | 5/1912 | Geisel |
| 1,072,473 A | 9/1913 | Kindberg |
| 1,095,391 A | 5/1914 | Fogle |
| 1,106,418 A | 8/1914 | Sprunger |
| 1,262,021 A | 4/1918 | Conroy |
| 1,533,470 A | 4/1925 | Schmitt |
| 1,597,265 A | 8/1926 | Cashiere |
| 1,652,581 A | 12/1927 | Roberts |
| 1,669,484 A | 5/1928 | Mowry |
| 1,708,113 A | 4/1929 | Allen |
| 1,773,847 A | 8/1930 | Nickles |
| 1,803,626 A | 5/1931 | Lasley |
| 1,912,425 A | 6/1933 | Baumer |
| 2,199,127 A | 4/1940 | Clearmont |
| 2,293,625 A | 8/1942 | Patch |
| 2,402,579 A | 6/1946 | Ross |
| 2,445,403 A | 7/1948 | Mayerman |
| 2,523,682 A | 9/1950 | Corwin |
| 2,594,065 A | 4/1952 | O'Neill |
| 2,645,541 A | 7/1953 | Mintz et al. |
| 2,781,766 A | 2/1957 | Krieger |
| 3,007,539 A | 11/1961 | Brewer et al. |
| 3,292,561 A | 12/1966 | Hoodis |
| 3,375,624 A | 4/1968 | Mikulin |
| 3,435,570 A | 4/1969 | Berry |
| 3,502,091 A | 3/1970 | Goltemann |
| 3,509,891 A | 5/1970 | De Bolt |
| 3,675,667 A | 7/1972 | Miller |
| 3,700,070 A | 10/1972 | King |
| 3,746,151 A | 7/1973 | Brophy et al. |
| 3,766,932 A | 10/1973 | Sidis et al. |
| 3,796,282 A | 3/1974 | Denier et al. |
| 3,810,482 A | 5/1974 | Beavers |
| 3,941,140 A | 3/1976 | Beavers |
| 3,960,161 A | 6/1976 | Norman |
| 3,990,463 A | 11/1976 | Norman |
| 4,023,306 A | 5/1977 | Ruggieri |
| 4,026,312 A | 5/1977 | Beavers |
| 4,067,346 A | 1/1978 | Husted |
| 4,070,807 A | 1/1978 | Smith, Jr. |
| 4,077,417 A | 3/1978 | Beavers |
| 4,088,203 A | 5/1978 | Smith, Jr. |
| 4,130,178 A | 12/1978 | Smith, Jr. |
| 4,131,205 A | 12/1978 | Malecki |
| 4,138,952 A | 2/1979 | Hodson |
| 4,154,253 A | 5/1979 | McCullough |
| 4,285,354 A | 8/1981 | Beavers |
| 4,425,929 A | 1/1984 | VonMosshalm |
| D276,466 S | 11/1984 | Giovagnoli |
| 4,635,729 A | 1/1987 | Harmathy |
| 4,637,748 A | 1/1987 | Beavers |
| 4,724,181 A | 2/1988 | Mingenbach |
| 4,815,784 A | 3/1989 | Zheng |
| 4,819,680 A | 4/1989 | Beavers |
| 4,828,123 A | 5/1989 | Basore |
| D304,981 S | 12/1989 | Raskas |
| 4,941,499 A | 7/1990 | Pelsue et al. |
| 4,950,511 A | 8/1990 | Francis |
| 4,951,333 A | 8/1990 | Gutch |
| 4,970,841 A | 11/1990 | Zeigler |
| 4,974,525 A | 12/1990 | Sheffield |
| 4,998,552 A | 3/1991 | Niksic et al. |
| 5,010,909 A | 4/1991 | Cleveland |
| 5,024,262 A | 6/1991 | Huang |
| D318,767 S | 8/1991 | Schneider et al. |
| 5,038,812 A | 8/1991 | Norman |
| 5,069,572 A | 12/1991 | Niksic |
| D327,189 S | 6/1992 | McPherson et al. |
| 5,123,550 A | 6/1992 | Nodskov et al. |
| 5,137,044 A | 8/1992 | Brady |
| 5,140,768 A | 8/1992 | Forbes |
| 5,143,214 A | 9/1992 | Freelander et al. |
| 5,145,029 A | 9/1992 | Blasdell, Jr. et al. |
| 5,146,635 A | 9/1992 | Gastle et al. |
| 5,163,262 A | 11/1992 | Adams |
| 5,179,798 A | 1/1993 | Sonagere |
| 5,222,513 A | 6/1993 | Hilliard |
| 5,301,705 A | 4/1994 | Zheng |
| 5,351,843 A | 10/1994 | Wichman et al. |
| 5,375,368 A | 12/1994 | Motz |
| 5,394,897 A | 3/1995 | Leavitt |
| 5,411,046 A | 5/1995 | Wan |
| 5,467,794 A | 11/1995 | Zheng |
| 5,519,964 A | 5/1996 | Kujirai |
| 5,560,385 A | 10/1996 | Zheng |
| 5,579,799 A | 12/1996 | Zheng |
| 5,605,007 A | 2/1997 | Hinsperger |
| 5,622,415 A | 4/1997 | Felsenthal et al. |
| 5,660,002 A | 8/1997 | Lashinger |
| 5,664,596 A | 9/1997 | Zheng |
| 5,671,766 A | 9/1997 | Williams |
| 5,692,337 A | 12/1997 | Motz |
| 5,778,915 A | 7/1998 | Zheng |
| 5,816,279 A | 10/1998 | Zheng |
| 5,975,101 A | 11/1999 | Zheng |
| 6,014,837 A | 1/2000 | Morgan |
| 6,019,112 A | 2/2000 | Matlock |
| 6,021,794 A | 2/2000 | Guerra |
| 6,088,953 A | 7/2000 | Morgan |
| D429,307 S | 8/2000 | Wu et al. |
| 6,098,335 A | 8/2000 | Brown |
| 6,155,281 A | 12/2000 | Zheng |
| 6,209,557 B1 | 4/2001 | Zheng |
| 6,257,263 B1 | 7/2001 | Brereton |
| 6,269,826 B1 | 8/2001 | Zheng |
| 6,296,415 B1 | 10/2001 | Johnson et al. |
| D452,153 S | 12/2001 | Dardashti |
| 6,325,086 B1 | 12/2001 | Shinner et al. |
| 6,390,111 B2 | 5/2002 | Zheng |
| 6,427,858 B2 | 8/2002 | Sabounjian |
| 6,499,260 B2 | 12/2002 | Kasinger et al. |
| 6,575,185 B2 | 6/2003 | Zheng |
| 6,701,948 B2 | 3/2004 | Jopp |
| 6,799,594 B2 | 10/2004 | Kuo |
| D499,278 S | 12/2004 | Dardashti |
| 6,829,869 B1 | 12/2004 | Savoie |
| 6,840,182 B2 | 1/2005 | Price |
| D504,519 S | 4/2005 | Wehner |
| 6,892,743 B2 | 5/2005 | Armstrong |
| D510,972 S | 10/2005 | Wehner |
| D511,196 S | 11/2005 | Wehner |
| 7,020,993 B2 | 4/2006 | Pritchard |
| 7,063,035 B2 | 6/2006 | Belcher |
| 7,121,290 B2 | 10/2006 | Eastman |
| D536,761 S | 2/2007 | Wehner |
| D537,275 S | 2/2007 | Chang |
| D537,276 S | 2/2007 | Kelman |
| D570,438 S | 6/2008 | Adams |
| D570,439 S | 6/2008 | Adams |
| 7,614,415 B1 | 11/2009 | Wehner |
| 7,665,478 B2 | 2/2010 | Wehner |
| D613,975 S | 4/2010 | Davis |
| D630,266 S | 1/2011 | Frank et al. |
| D640,798 S | 6/2011 | Rassat |
| 8,371,088 B2 | 2/2013 | Merrifield |

(56) References Cited

U.S. PATENT DOCUMENTS

| | | |
|---|---|---|
| D693,158 S | 11/2013 | Jung et al. |
| 8,590,716 B2 | 11/2013 | Behjat |
| 8,616,328 B2 | 12/2013 | Daraio et al. |
| 2004/0074858 A1 | 4/2004 | Thuma et al. |
| 2004/0206013 A1 | 10/2004 | Berg |
| 2005/0211652 A1 | 9/2005 | Li |
| 2006/0055289 A1 | 3/2006 | Wu |
| 2007/0138119 A1 | 6/2007 | Schwerdlin |
| 2007/0221598 A1 | 9/2007 | Sabounjian |
| 2011/0253651 A1 | 10/2011 | Behjat |
| 2012/0006371 A1 | 1/2012 | Livacich et al. |
| 2012/0204770 A1 | 8/2012 | Grace |

COLLAPSIBLE SHELVING UNITS AND COLLAPSIBLE ENCLOSURES

CROSS-REFERENCE TO RELATED APPLICATIONS

This application is a divisional of U.S. patent application Ser. No. 13/630,213, which was filed on Sep. 28, 2012 and which claims the benefit of U.S. Provisional Patent Application Ser. No. 61/619,967, which was filed on Apr. 4, 2012, and also claims the benefit of Chinese Patent Application No. 2011-20371803.X, which was filed Sep. 28, 2011, both of which are incorporated herein in their entireties by reference.

BACKGROUND

Storage shelving units can be used for holding items in various places, such as gardens, courtyards, residences and garages. Many shelving units are large, difficult to assemble and disassemble, and cannot be easily transported from place to place.

SUMMARY

One aspect of the disclosed embodiments is an enclosure that includes a shelving unit and a flexible cover. The shelving unit includes a first collapsible frame, a second collapsible frame, a plurality of shelf support rods each having a first end connected to the first collapsible frame and a second end connected to the second collapsible frame, a plurality of shelves that are each removably supported by a pair of shelf support rods from the plurality of shelf support rods, and at least a first cover support having a first end connected to the first collapsible frame and a second end connected to the second collapsible frame. The flexible cover at least partially encloses the shelving unit and is supported with respect to the shelving unit at least in part by engagement of the flexible cover with the first cover support. At least a portion of the flexible cover is at least translucent.

Another aspect of the disclosed embodiments is an enclosure that includes a shelving unit and a flexible cover. The shelving unit includes a first collapsible frame that includes pivotally connected frame members in a lazy tongs configuration, a second collapsible frame that includes pivotally connected frame members in a lazy tongs configuration, a plurality of shelf support rods each having a first end connected to the first collapsible frame and a second end connected to the second collapsible frame, a plurality of shelves that are each removably supported by a pair of shelf support rods from the plurality of shelf support rods, a first cover support having a first end connected to the first collapsible frame and a second end connected to the second collapsible frame, and a second cover support having a first end connected to the first collapsible frame and a second end connected to the second collapsible frame. The first and second collapsible frames are extendable and collapsible in unison to move the shelving unit between an extended position and a collapsed position. The flexible cover at least partially encloses the shelving unit and is supported with respect to the shelving unit at least in part by engagement of the flexible cover with the first cover support and the second cover support, wherein at least a portion of the flexible cover is at least translucent.

Another aspect of the disclosed embodiments is an enclosure that includes a first collapsible shelving unit, a second collapsible shelving unit that is spaced apart from the first collapsible shelving unit, at least a first cover support having a first end connected to the first collapsible shelving unit and a second end connected to the second collapsible shelving unit, and a flexible cover. The flexible cover at least partially encloses the first collapsible shelving unit and the second collapsible shelving unit and is supported with respect to the first collapsible shelving unit and the second collapsible shelving unit at least in part by engagement of the flexible cover with the first cover support, wherein at least a portion of the flexible cover is at least translucent.

DETAILED DESCRIPTION

Figure 1:
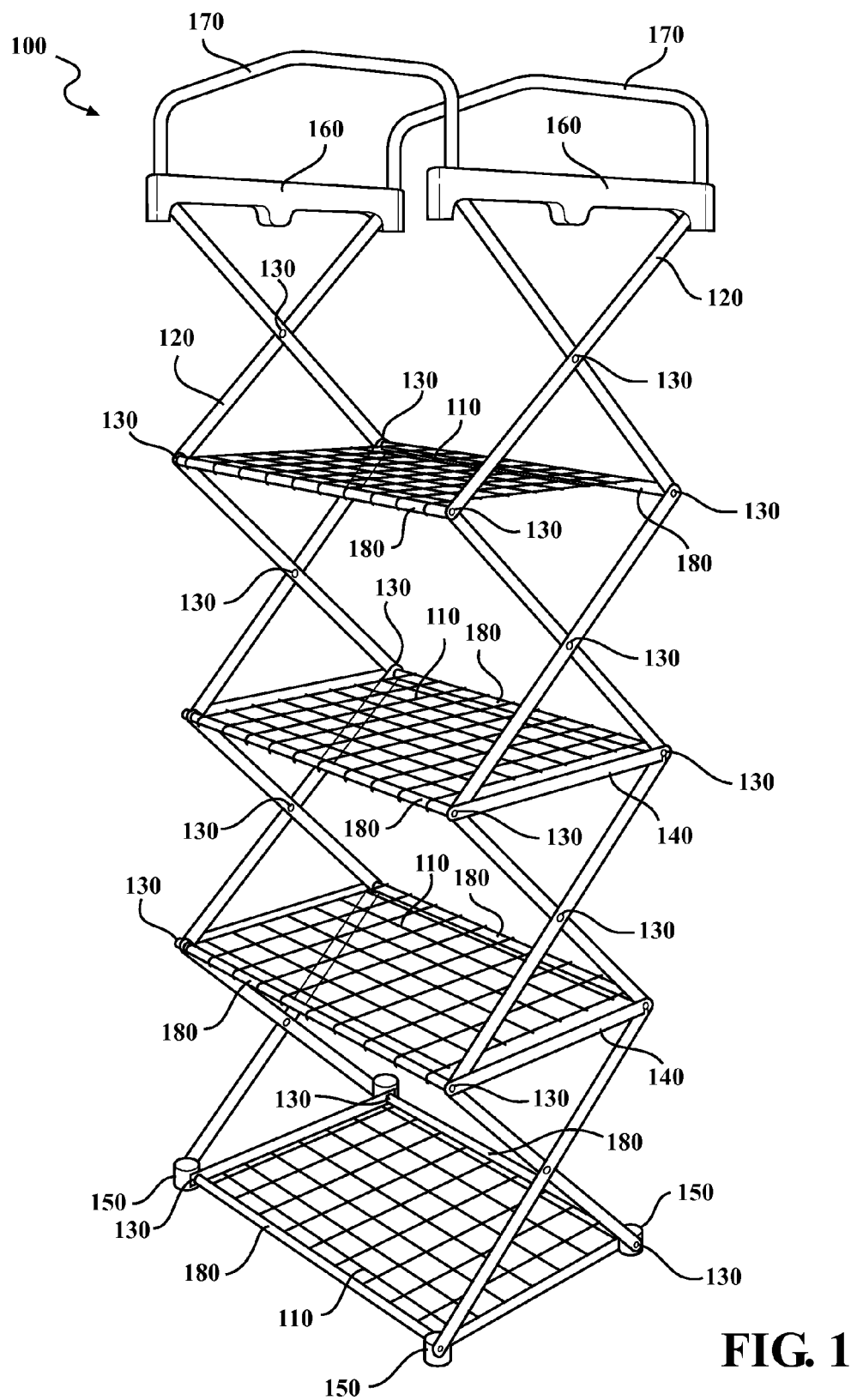
FIG. 1 is an illustration showing a collapsible shelving unit.

FIG. 1 shows a collapsible shelving unit 100. The collapsible shelving unit 100 can include a plurality of wire shelves 110, the front and back ends of which are bent downward to define a u-shaped profile for each of the wire shelves 110. The wire shelves 110 are supported by horizontal shelf support bars 180. The ends of each end of the horizontal shelf support bars 180 are connected to respective collapsible frames 120 by hinges, pivots, or fixed joints. The collapsible frames 120 each include a plurality of frame members that are pivotally connected to each other at pivot joints 130 to define a lazy tongs configuration. Locking bars 140 can be provided on each of the collapsible frames 120 to prevent movement from the extended positions thereof to the collapsed positions thereof, by pivotal connection of a first end of each locking bar 140 at a first one of the pivot joints 130 and a releasable connection of a second end of each locking bar at a second one of the pivot joints 130, such by a hook that engages a pin, or any other suitable structure. The collapsible shelving unit 100 includes a pair of top frames 160, which are located at the top of each of the collapsible frames 120. The two top bars 170 extend between the top frames 160. A pair of cylindrical legs 150 is located at the bottom of each of the collapsible frames 120. Components of the collapsible shelving unit 100 can be manufactured with a variety of materials, such as steel.

The collapsible shelving unit 100 can be moved between extended and collapsed positions. To maintain the collapsible shelving unit 100 in the extended position, the locking bars 140 are engaged. The wire shelves 110 are removed prior to moving the collapsible shelving unit 100 from the extended position to the collapsed position and are replaced when the collapsible shelving unit 100 is returned to the extended position. A flexible cover (not shown in FIG. 1) can be put on the collapsible shelving unit 100 and be supported by the top bars 170. When not in use, the collapsible shelving unit can be easily folded to be ported or stored by disengaging the locking bars 140 and collapsing the collapsible frames 120.

Figure 2:
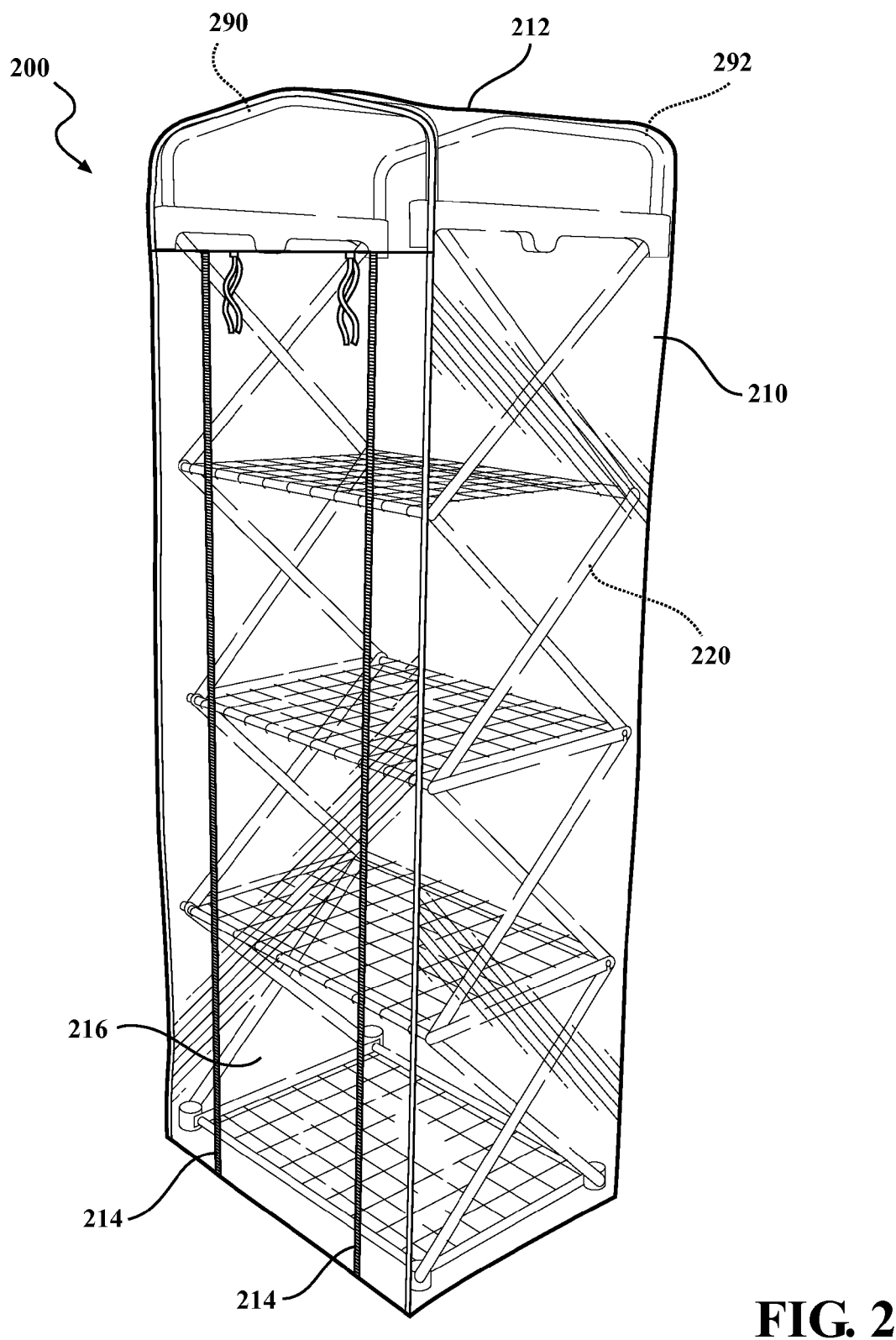
FIG. 2 is an illustration showing a first example of a collapsible enclosure that includes a flexible cover that is supported by a collapsible shelving unit.

FIG. 2 is an illustration showing a collapsible enclosure 200 according to a first example. The collapsible enclosure 200 includes a flexible cover 210 that is supported by a collapsible shelving unit 220.

The flexible cover 210 at least partially encloses the collapsible shelving unit 220 and is supported with respect to the collapsible shelving unit 220 by engagement of the flexible cover 210 with at least a portion of the collapsible shelving unit 220. At least a portion of the flexible cover 210 is at least translucent. Furthermore, all or a portion of the flexible cover 210 can allow for transmission of at least infrared and invisible wavelengths of electromagnetic radiation. The flexible cover 210 can, in cooperation with the collapsible shelving unit 220, define an arched top surface 212. The flexible cover 210 can also include one or more zippers 214 or other closure structures that define an openable panel 216 (i.e., a door) in the flexible cover 210.

Figure 3:
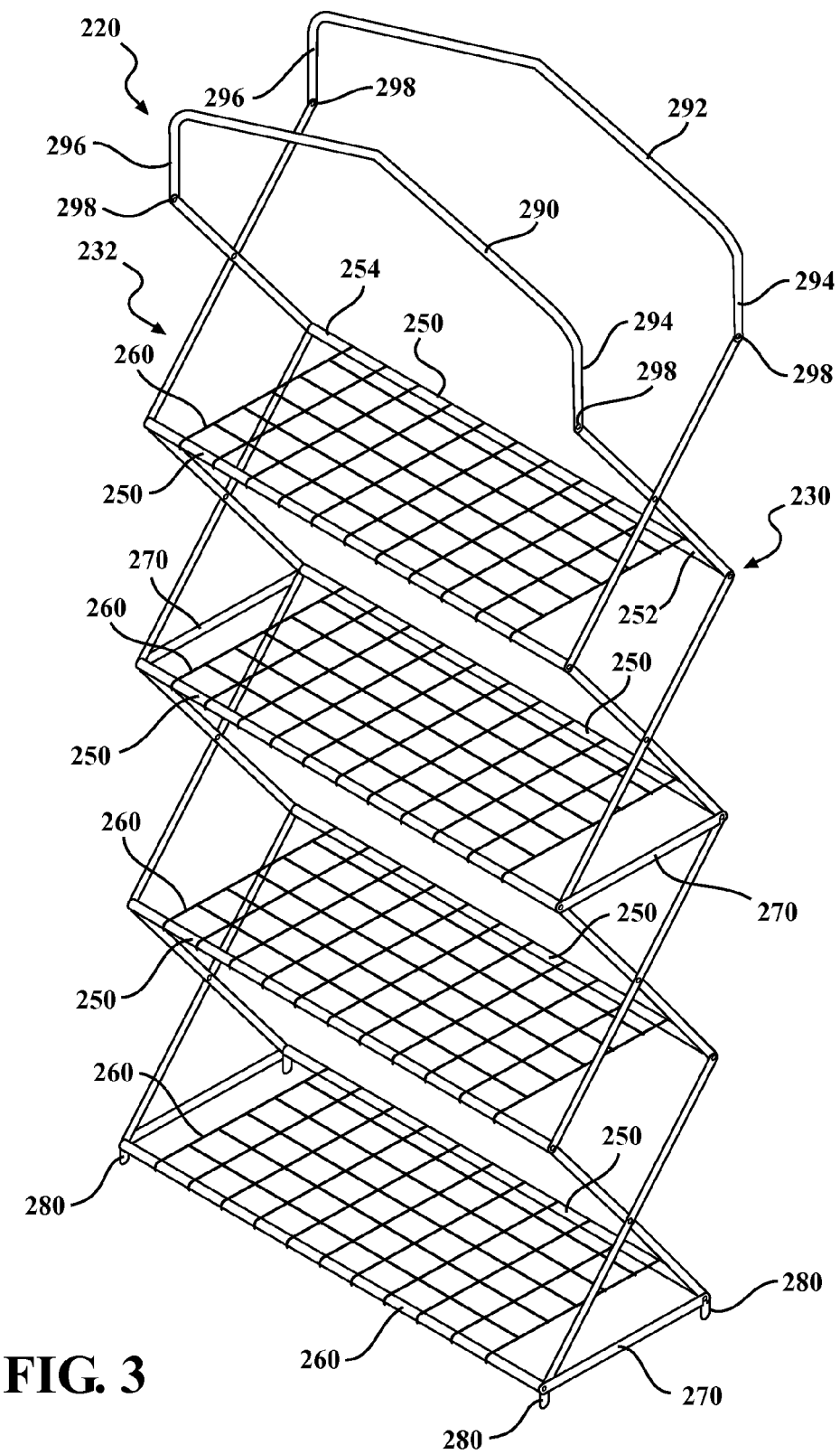
FIG. 3 is a perspective view showing the collapsible shelving unit of FIG. 2.
Figure 4:
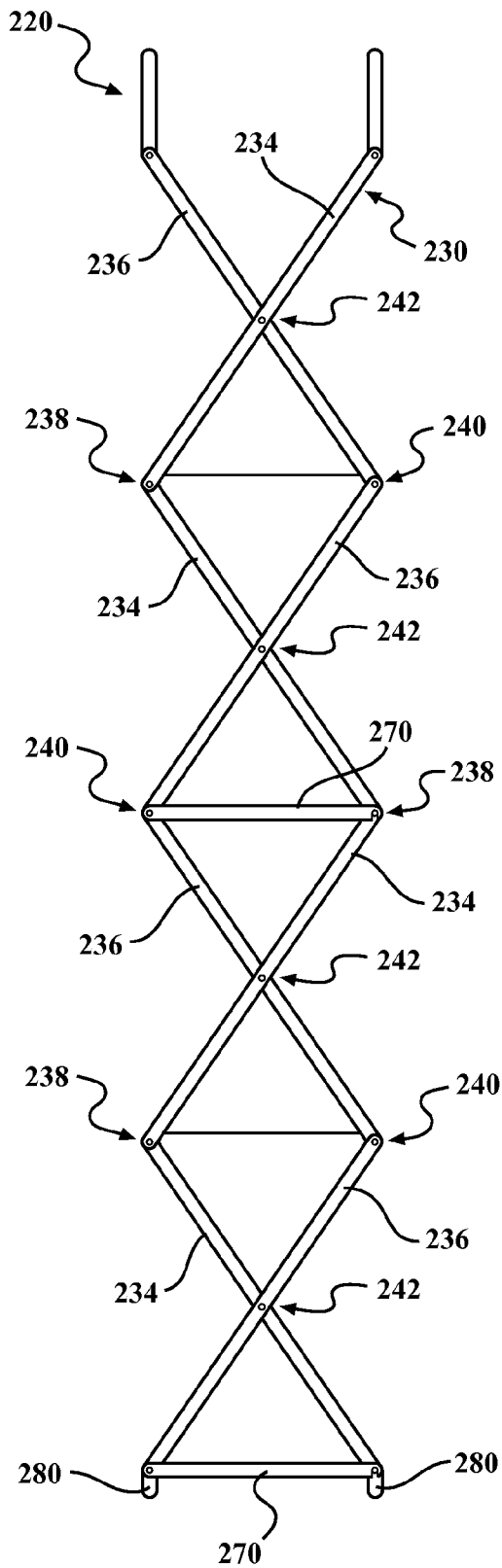
FIG. 4 is an end view showing the collapsible shelving unit of FIG. 2.

As shown in FIGS. 3-4, the collapsible shelving unit 220 can include a first collapsible frame 230 and a second collapsible frame 232. The first collapsible frame 230 and the second collapsible frame 232 can each include a plurality of pivotally connected frame members that define a lazy tongs configuration for each of the first collapsible frame 230 and the second collapsible frame 232. In particular, with reference to FIG. 4, each of the first collapsible frame 230 and the second collapsible frame 232 can include a first set of frame members 234 and a second set of frame members 236. The frame members from the first set of frame members 234 are pivotally connected to one another in an end-to-end manner at pivot joints 238. Similarly, the frame members of the second set of frame members 236 are pivotally connected to one another in an end-to-end manner at pivot joints 240. Pairs of the frame members from the first set of frame members 234 and the second set of frame members 236 are connected to one another at intermediate locations thereon at intermediate pivot joints 242. By way of the pivotally connected frame members in a lazy tongs configuration, each of the first collapsible frame 230 and the second collapsible frame 232 are extendible and collapsible in unison to move the collapsible shelving unit 220 between an extended position and a collapsed position.

The collapsible shelving unit 220 includes a plurality of shelf support rods 250. Each of the shelf support rods 250 includes a first end 252 that is connected to the first collapsible frame 230 and a second end 254 that is connected to the second collapsible frame 232. The shelf support rods 250 can be connected to the first collapsible frame 230 and the second collapsible frame 232 by any suitable means such as fixed joints, pivot joints, hinges, or other structures.

The collapsible shelving unit 220 can include a plurality of shelves 260. Each of the shelves 260 is removably supported by a pair of the shelf support rods 250. The ends of the shelves 260 can be bent downward to define a U-shape profile for each of the shelves 260, thereby providing a stable connection between the shelves 260 and the shelf support rods 250.

One or more locking bars 270 can be provided on each of the first collapsible frame 230 and the second collapsible frame 232 to prevent the collapsible shelving unit 220 from moving from the extended position to the collapsed position. The locking bars 270 can include structures such as hooks that are engageable with posts or other structures that are provided on the first collapsible frame 230 and the second collapsible frame 232. One end of each of the locking bars 270 can be pivotally mounted to a respective one of the first collapsible frame 230 or the second collapsible frame 232.

In order to support the collapsible shelving unit 220 with respect to a supporting surface, such as a floor, feet 280 can be provided on each of the first collapsible frame 230 and the second collapsible frame 232.

A first cover support 290 and a second cover support 292 each have a first end 294 connected to the first collapsible frame 230 and a second end 296 that is connected to the second collapsible frame 232. The first cover support 290 and the second cover support 292 are engageable with the flexible cover 210 (FIG. 2) for supporting the flexible cover 210 with respect to the collapsible shelving unit 220. The first cover support 290 and the second cover support 292 can be pivotally connected to each of the first collapsible frame 230 and the second collapsible frame 232 at pivot joints 298. The pivot joints 298 can be selectively lockable, for example, by incorporation of at least one locking structure for selectively restraining pivotal motion of the first cover support 290 and the second cover support 292 with respect to the first collapsible frame 230 and a second collapsible frame 232.

The collapsible shelving unit 220 can be defined as having a first lateral side, a second lateral side, a first transverse side, and a second transverse side. The first collapsible frame 230 is located at the first lateral side, the second collapsible frame 232 is located at the second lateral side, the first cover support 290 is located at and extends along the first lateral side, and the second cover support 292 is located at and extends along the second lateral side.

Figure 5:
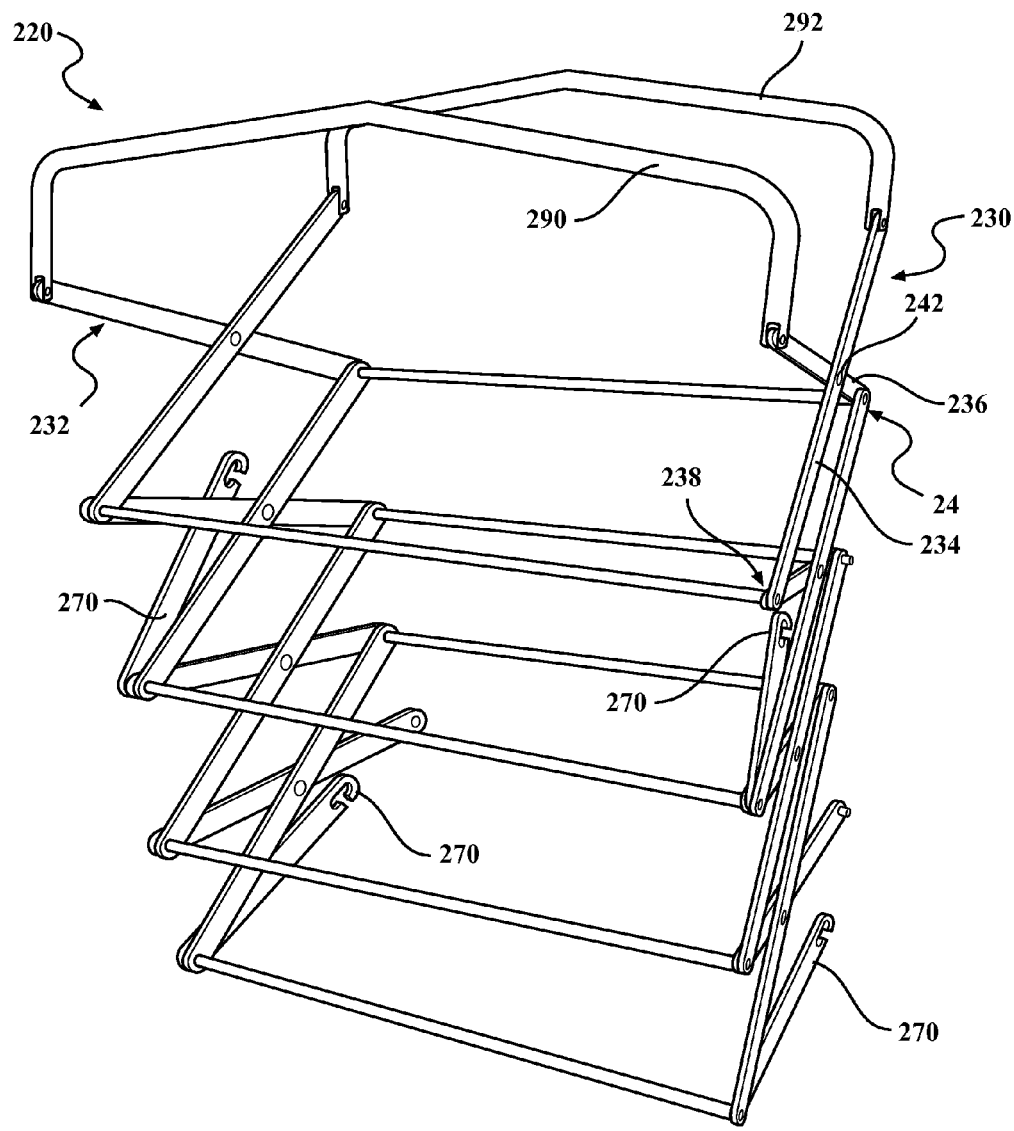
FIG. 5 is an illustration showing the collapsible shelving unit of FIG. 2 in a partially collapsed position.
Figure 6:
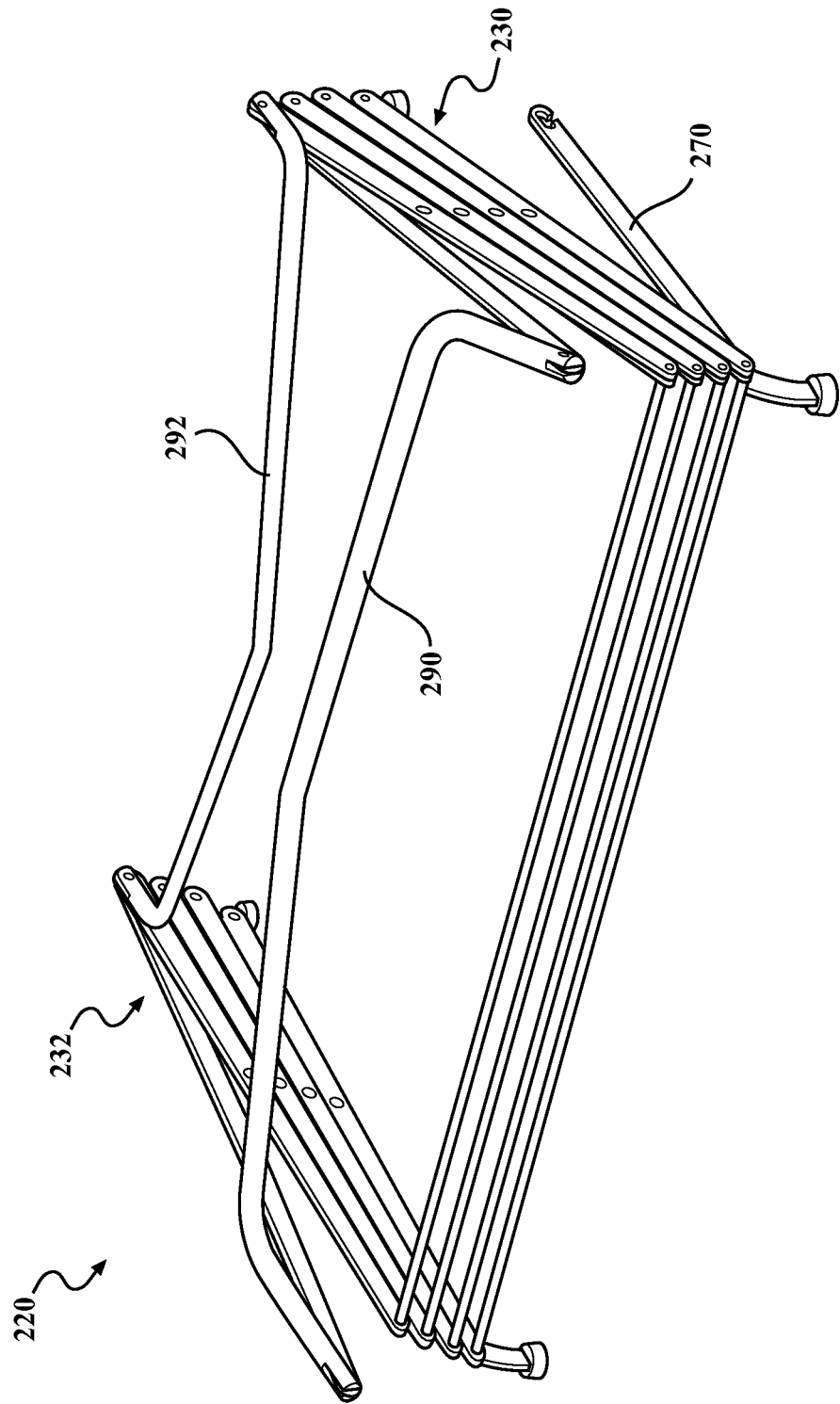
FIG. 6 is an illustration showing the collapsible shelving unit of FIG. 2 in a fully collapsed position.
Figure 7:
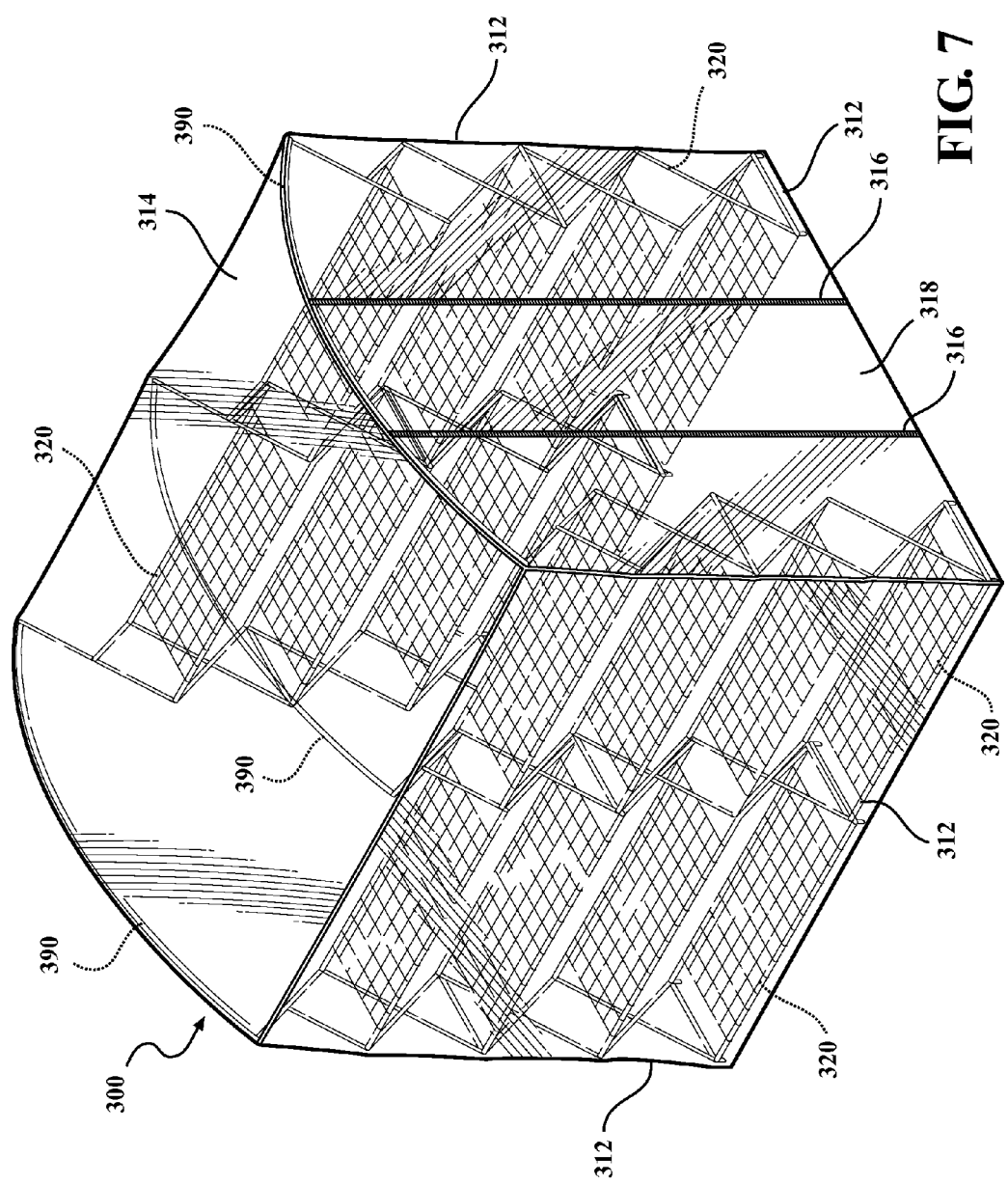
FIG. 7 is an illustration showing a second example of a collapsible enclosure that includes a flexible cover that is support by one or more pairs of collapsible shelving units.

As previously noted, the collapsible shelving unit 220 is moveable between an extended position and a collapsed position. The extended position is shown in FIGS. 3-4. In FIG. 5, the locking bars 270 have been disengaged, and the first collapsible frame 230 and the second collapsible frame 232 are free to move toward the collapsed position by relative rotation of the frame members 234, 236 at the pivot joints 238, 240, 242. As shown in FIG. 5, the shelves 260 are removed prior to movement of the collapsible shelving unit 220 from the extended position toward the collapsed position. In FIG. 6, the collapsible shelving unit 220 is shown in the fully collapsed position with the first cover support 290 and the second cover support 292 unlocked and pivoted with respect to the first collapsible frame 230 and the second collapsible frame 232. FIG. 7 is an illustration showing a collapsible enclosure 300 according to a second example. The collapsible enclosure 300 includes a flexible cover 310 that is supported by two pairs of collapsible shelving units 320.

The flexible cover 310 is similar in material and construction to the flexible cover 210 of FIG. 2. The flexible cover 310 can define a plurality of upright walls 312 and, in cooperation with a plurality of substantially arcuate cover supports 390 that extend between spaced apart collapsible shelving units 320 of the pairs of collapsible shelving units, the flexible cover 310 can define an arched top surface 314. A pair of zippers 316 on one of the upright walls 312 can cooperate to define a door panel 318.

Although the collapsible enclosure 300 of FIG. 7 is shown as being supported by two pairs of collapsible shelving units 320, it should be understood that such a collapsible enclosure can be supported by one or more pairs of collapsible shelving units 320.

Figure 8:
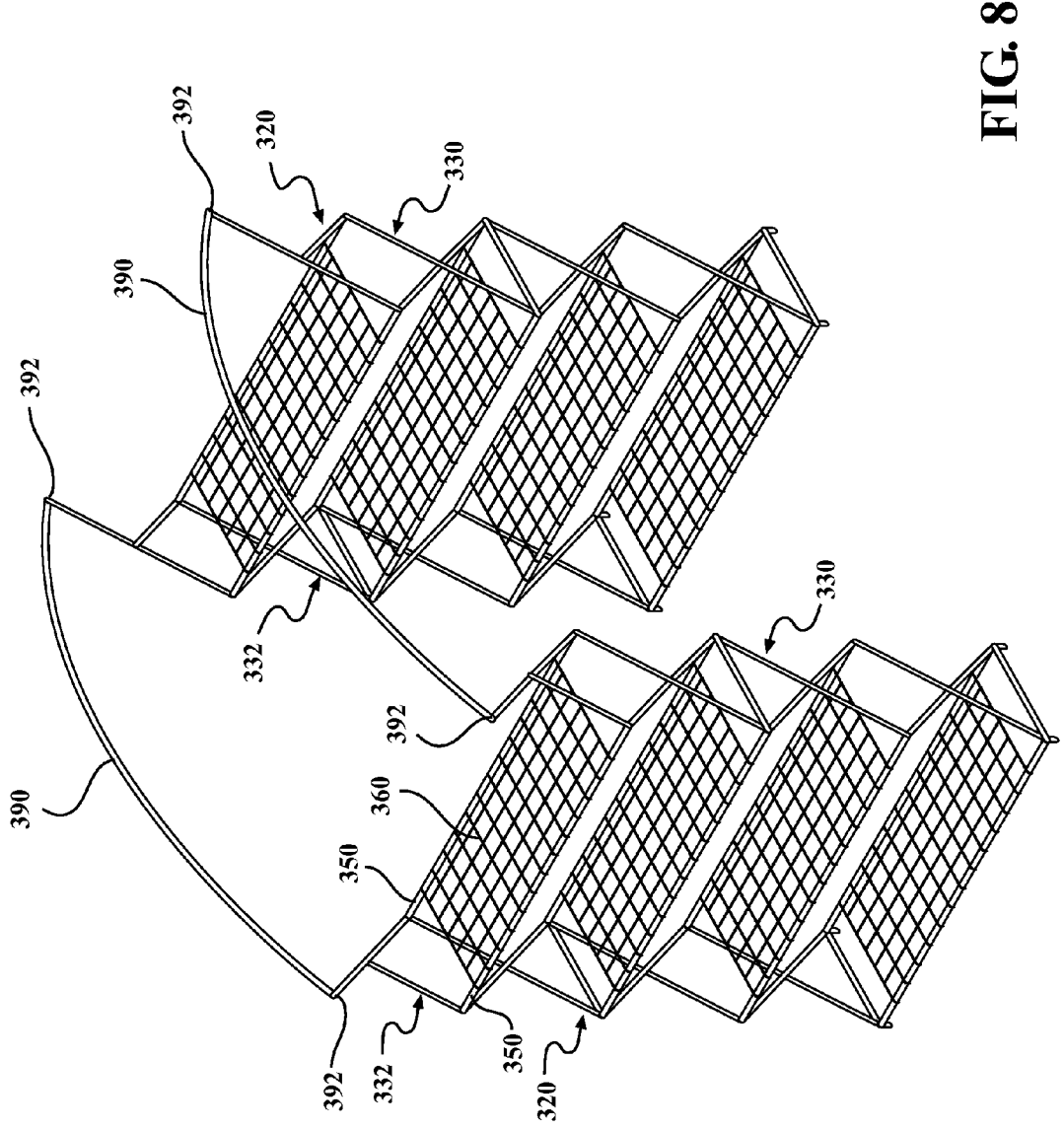
FIG. 8 is a perspective view showing the pair of collapsible shelving units of FIG. 7.

FIG. 8 is a perspective view showing a pair of the collapsible shelving units 320 from FIG. 7. The collapsible shelving units 320 are similar in construction to the collapsible shelving units 220 of FIGS. 3-4, with the exception that the first and second cover supports 290, 292 are omitted. Each of the collapsible shelving units 320 includes a first collapsible frame 330 and a second collapsible frame 332, which are constructed according to the description of the first collapsible frame 230 and the second collapsible frame 232. The collapsible shelving units 320 also include shelf support rods 350 and shelves 360. The two collapsible shelving units shown in FIG. 8 are spaced apart from one another. When combined with the flexible cover 310 (FIG. 7), this allows an open interior space to be defined for the collapsible enclosure 300. To support the flexible cover 310, the substantially arcuate cover supports 390 extend between the collapsible shelving units 320. In particular, one of the substantially arcuate cover supports 390 extends between the first collapsible frames 330 of the pair of collapsible shelving units 320, and another of the substantially arcuate cover supports 390 extends between the second collapsible frames 332 of the pair of collapsible shelving units 320. The substantially arcuate cover supports 390 can be removably connected to the first collapsible frame 330 and the second collapsible frame 332 of each of the collapsible shelving units 320 at joints 392 that can include connecting structures, such as pins or other suitable hardware.

In use, the collapsible shelving units 320 and collapsible enclosures shown herein can be used for purposes such as indoor storage, outdoor storage, or as collapsible greenhouses when used with flexible covers.

It is to be understood that the disclosure is not to be limited to the disclosed embodiments but, on the contrary, is intended to cover various modifications and equivalent arrangements included within the spirit and scope of the appended claims.

The invention claimed is:

1. A covered shelving assembly, comprising: a first collapsible shelving unit; a second collapsible shelving unit that is spaced apart from the first collapsible shelving unit;
    wherein the first shelving unit and the second shelving unit each include a first collapsible frame, a second collapsible frame, a plurality of shelf support rods each having a first end connected to the first collapsible frame and a second end connected to the second collapsible frame, and a plurality of shelves that are each removably attached to corresponding pairs of shelf support rods from the plurality of shelf support rods;
    at least a first cover support having a first end connected to a top end of the first collapsible shelving unit and a second end connected to a top end of the second collapsible shelving unit, wherein the first cover support is a substantially arcuate shaped member; and
    a flexible cover that at least partially encloses the first collapsible shelving unit and the second collapsible shelving unit and is supported with respect to the first collapsible shelving unit and the second collapsible shelving unit at least in part by engagement of the flexible cover with the first cover support, wherein at least a portion of the flexible cover is at least translucent; wherein the first cover support and the flexible cover cooperate to define an arched top surface that hovers over portions of the first and second collapsible units.

2. The covered shelving assembly of claim 1, further comprising:
    a second cover support having a first end connected to the first collapsible shelving unit and a second end connected to the second collapsible shelving unit, wherein the flexible cover is supported with respect to the shelving unit at least in part by engagement of the flexible cover with the second cover support.

3. The covered shelving assembly of claim 1, wherein the flexible cover allows for transmission of at least infrared and visible wavelengths of electromagnetic radiation.

4. A covered shelving assembly for storing items, comprising:
    a first collapsible shelving unit and a second collapsible shelving unit that are spaced apart from each other and each include:
        a first collapsible frame that includes pivotally connected frame members in a lazy tongs configuration,
        a second collapsible frame that includes pivotally connected frame members in a lazy tongs configuration, wherein the first and second collapsible frames are extendable and collapsible in unison to move the shelving unit between an extended position and a collapsed position,
        a plurality of shelf support rods each having a first end connected to the first collapsible frame and a second end connected to the second collapsible frame, and
        a plurality of shelves that are each removably supported by a pair of shelf support rods from the plurality of shelf support rods, the plurality of shelves including a first shelf that is removably supported on a corresponding first pair of shelf support rods from the plurality of shelf support rods at a first elevation and a second shelf that is removably supported on a corresponding second pair of shelf support rods from the plurality of shelf support rods at a second elevation;
    a first cover support having a first end connected to the first collapsible frame of the first shelving unit and a second end connected to the first collapsible frame of the second shelving unit, and
    a second cover support having a first end connected to the second collapsible frame of the first shelving unit and a second end connected to the second collapsible frame of the second shelving unit, and
    a flexible cover that substantially encloses the first shelving unit and the second shelving unit is supported with respect to the shelving unit at least in part by resting a top surface of the flexible cover on the first cover support and the second cover support when the first shelving unit and the second shelving unit are in the extended position to elevate the top surface of the flexible cover above the first collapsible shelving unit and the second collapsible shelving unit, the flexible cover having an openable panel, wherein the stored items can be covered within the flexible cover or accessed by opening the openable panel.

5. The covered shelving assembly of claim 4, wherein the first collapsible shelving unit and the second collapsible shelving unit each have a first lateral side, a second lateral side, a first transverse side, and a second transverse side, the first collapsible frame is located at the first lateral side, the second collapsible frame is located at the second lateral side, the first cover support is located at the first lateral side, and the second cover support is located at the second lateral side.

6. The covered shelving assembly of claim 4, wherein the first cover support and the second cover support are each pivotally connected to the first collapsible shelving unit and the second collapsible shelving unit.

7. The covered shelving assembly of claim 4, wherein each shelf from the plurality of shelves has a front end and a back end that are each bent downward for removable engagement with a respective shelf support rod from the plurality of shelf support rods.

8. The covered shelving assembly of claim 4, wherein each of the plurality of shelves is a wire shelf.

9. The covered shelving assembly of claim 4, wherein the flexible cover includes a plurality of upright walls that are each substantially planar and a pair of vertically-oriented zippers spaced apart on a first upright wall from the plurality of upright walls that each extend from a free edge of the first upright wall to a respective intermediate point on the first upright wall to define the openable panel.

10. The covered shelving assembly of claim 4, wherein at least a portion of the flexible cover allows for transmission of at least infrared and visible wavelengths of electromagnetic radiation.

\* \* \* \* \*